United States Patent [19]
Krempa

[11] Patent Number: 4,555,014
[45] Date of Patent: Nov. 26, 1985

[54] CONVEYOR CHAIN LINK STRUCTURE

[75] Inventor: James F. Krempa, Milford, Mich.

[73] Assignee: Chain Supply Company, Detroit, Mich.

[21] Appl. No.: 680,749

[22] Filed: Dec. 12, 1984

Related U.S. Application Data

[63] Continuation of Ser. No. 404,632, Aug. 2, 1982, abandoned.

[51] Int. Cl.⁴ .............................................. B65G 17/38
[52] U.S. Cl. ............................... 198/852; 104/172 C; 474/211; 198/833
[58] Field of Search ............... 198/850, 852, 853, 833, 198/686, 687; 474/203, 211; 104/172 C; 59/78, 82, 84, 85, 86, 88

[56] References Cited

U.S. PATENT DOCUMENTS

| | | | |
|---|---|---|---|
| 2,646,160 | 7/1953 | Michna | 474/211 |
| 2,778,236 | 1/1957 | Proctor | 474/211 |
| 2,872,826 | 2/1959 | Proctor | 474/211 |
| 3,127,006 | 3/1964 | Tochtermann et al. | 198/686 |
| 3,202,266 | 8/1965 | Schmermund | 198/850 |
| 3,435,780 | 4/1969 | Czarnecki et al. | 104/172 C |
| 3,744,618 | 7/1973 | Monne et al. | 198/852 |
| 3,856,134 | 12/1974 | Krammer | 198/850 |
| 4,071,054 | 1/1978 | Santucci et al. | 198/852 |
| 4,086,855 | 5/1978 | Newbegin | 104/172 C |
| 4,345,685 | 8/1982 | Horkey | 198/852 |

Primary Examiner—Joseph E. Valenza
Assistant Examiner—Daniel R. Alexander
Attorney, Agent, or Firm—Hauke and Patalidis

[57] ABSTRACT

A conveyor drive and guide chain having links pivotably coupled to each other by a cylindrical socket and trunnion structure, the cylindrical socket being formed by an end member integral with the links and the trunnion being on the end of an offset member integral with another link, the trunnion being engaged in the half cylindrical recess and held in position with a cap clamped over the socket member and having a cylindrical segment surface preventing the trunnion from escaping its pivotal position. For the purpose of longitudinal alignment, the cylindrical socket is provided with a longitudinal ridge engaged in the corresponding longitudinal groove in the surface of the trunnion member.

10 Claims, 12 Drawing Figures

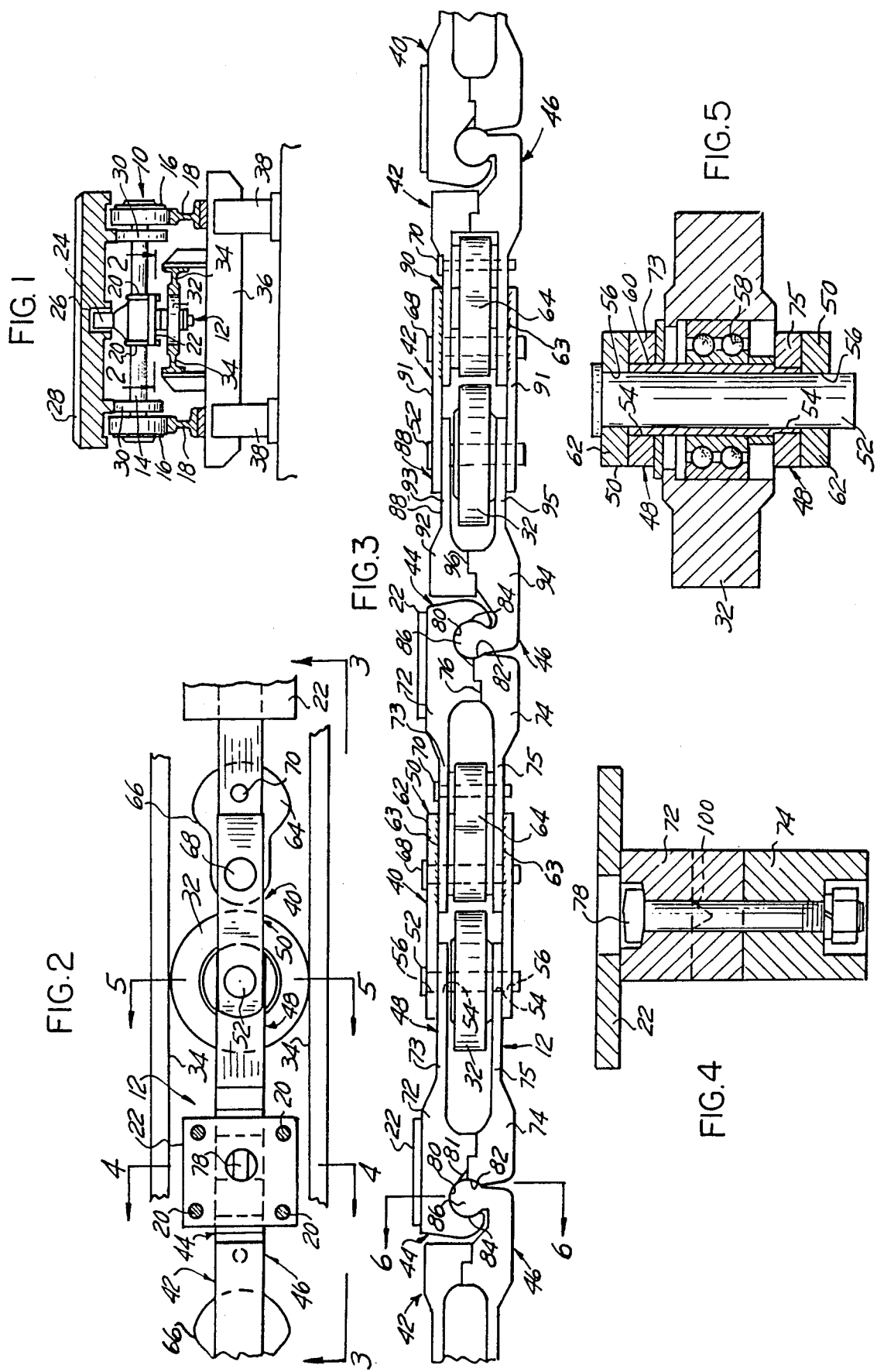

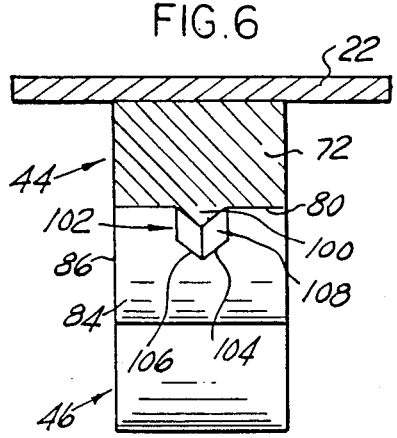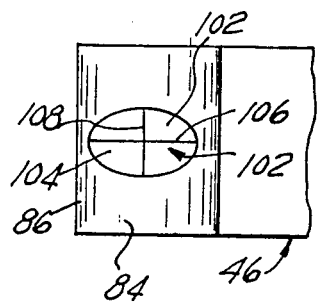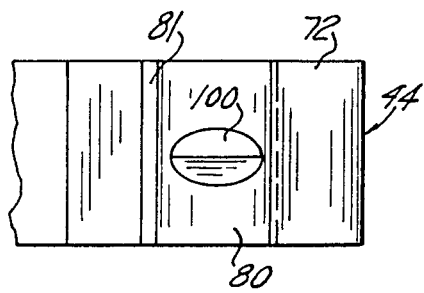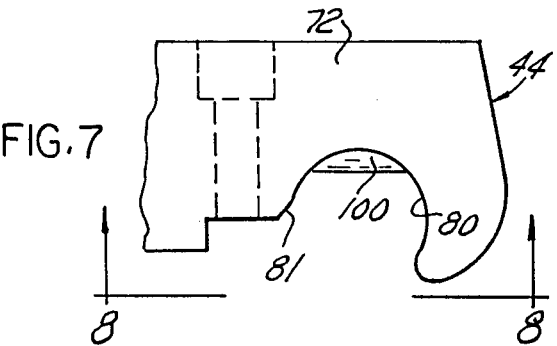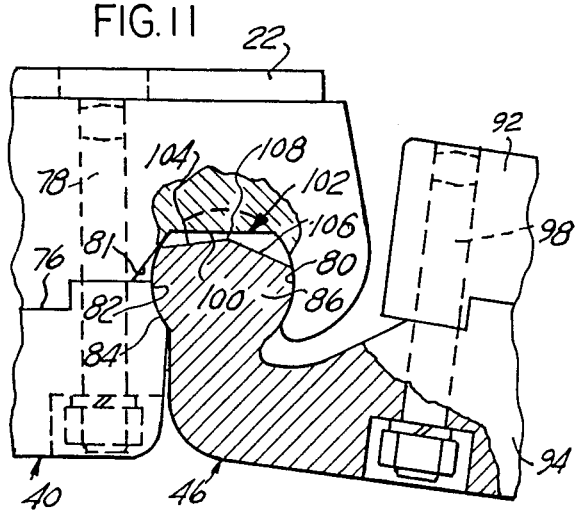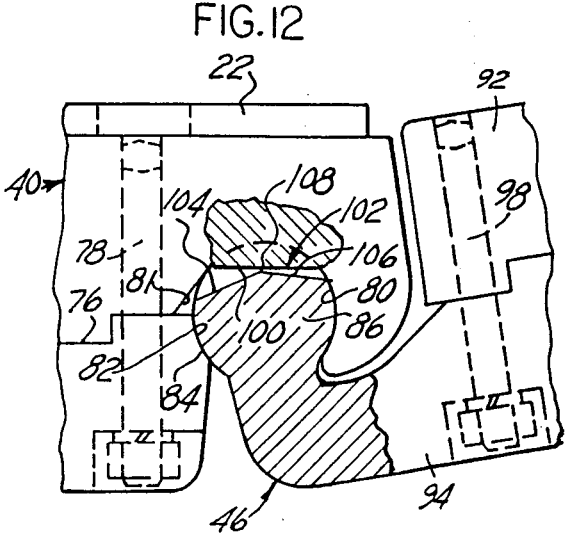

CONVEYOR CHAIN LINK STRUCTURE

CROSS-REFERENCE TO RELATED APPLICATION

The present invention application is a continuation of a application Ser. No. 404,632, filed Aug. 2, 1982, now abandoned.

BACKGROUND OF THE INVENTION

The present invention relates to a conveyor structure, and more particularly to a conveyor drive chain and chain link.

Power-driven conveyors are used in factories, for example, for transferring finished parts from one location to another, for conveying workpieces to diverse work stations during machining of the workpieces, or for moving equipment in the process of being assembled from one assembly station to another. In foundries, conveyors are used for moving molds, sandboxes, castings and the like.

Typically, power-driven conveyors are made of an assembly of load-carrying units and drive and guide units. The load-carrying unit takes generally the form of axles provided at each end with a wheel supported by a rail, a pair of parallel rails thereby supporting a full axle and wheel assembly. The axle and wheel assembly is attached to the guide and drive unit which takes the form of an endless chain having rollers, disposed with a vertical axis of rotation, between a pair of parallel guide rails. The rollers are supported by chain links, the links being interconnected such as to permit bending of the chain about a vertical axis of pivoting for passage of the conveyor through curves, and about a horizontal axis of pivoting for allowing passage of the conveyor to ramps for ascending or descending to another floor.

The chain is driven by passage through at least one drive unit having a pair of parallely disposed driving dog chains driven by an electric motor or the like, the driving dogs momentarily engaging a portion of the chain, such as the guide rollers or separate drive puller rollers as disclosed in U.S. Pat. No. 3,435,780, or any appropriate puller lugs mounted on the chain and adapted to be engaged by the driving dogs.

SUMMARY OF THE INVENTION

The present invention provides a simple mechanical coupling between consecutive links of a conveyor drive and guide chain, permitting bending of the chain about, for example, a horizontal axis during passage of the chain from one elevation to another. Instead of being effected by means of a pivot pin, the coupling takes the form of a male coupling member having a cylindrical peripheral portion in engagement with a partially cylindrical recess formed in a female coupling member, the male and female coupling members being prevented from relative lateral motion by a V-shaped key member projecting from the surface of the cylindrical recess in the female member and engaging a corresponding V-shaped groove formed on the periphery of the male cylindrical member.

These and other objects and advantages of the present invention will become apparent to those skilled in the art when the following description of the best mode contemplated for practicing the invention is read in conjunction with the accompanying drawing wherein:

BRIEF DESCRIPTION OF THE DRAWING

FIG. 1 is a transverse section through a conveyor structure having a drive and guide chain according to the present invention;

FIG. 2 is a partial top plan view of the drive and guide chain as seen from line 2—2 of FIG. 1;

FIG. 3 is a partial side elevation view thereof as seen from line 3—3 of FIG. 2;

FIG. 4 is a section along line 4—4 of FIG. 2;

FIG. 5 is a section along line 5—5 of FIG. 2;

FIG. 6 is a section along line 6—6 of FIG. 3;

FIG. 7 is a side elevation view of the chain link female coupling member, or socket member;

FIG. 8 is a bottom view from line 8—8 of FIG. 7;

FIG. 9 is a side elevation view of the chain link male coupling member, or trunnion member;

FIG. 10 is a top view thereof from line 10—10 of FIG. 9; and

FIGS. 11-12 are side elevation views with portion broken away, of the chain link coupling assembly of the invention.

DETAILED DESCRIPTION OF THE PREFERRED EMBODIMENT

With reference to the drawing, and more particularly to FIG. 1, a conveyor system generally comprises a load-carrying unit 10 attached to a drive and guide unit, or chain 12, disposed below the load-carrying unit 10. In the example of structure illustrated, the load-carrying unit 10 comprises an axle 14 provided with a pair of free-wheeling, load-supporting wheels 16 mounted each at an end of the axle 14 and riding on one of a pair of parallel support rails 18. The axle 14 is attached, for example by means of a pair of U-bolts 20, to a mounting plate 22 securely fixed to a portion of the drive and guide chain 12. In the structure illustrated, the axle 14 has a kingpin 24 loosely engaged in a recess 26 in the bottom of a platform 28, such as for example a foundry car platform. The platform 28 is supported by a pair of free-wheeling bolster wheels 30, each mounted on the axle 14 proximate one of the support wheels 16. A pair of axles 14, spaced apart and each attached in the manner described to the drive and guide chain 12 are used, for supporting the platform 28. It will be appreciated that the platform 28 may be replaced by any appropriate assembly support member or workpiece support member, in conveyor systems where parts are assembled at consecutive assembly stations or in machining operations where machining steps are effected at consecutive work stations. It will also be appreciated that rather than supporting a platform by means of a pair of axles 14 and driving the platform along the conveyor path, each individual axle 14 may be arranged to support an assembly holder or workpiece holder directly mounted on the top of the axle 14.

The drive and guide chain 12 is provided at regular intervals with a horizontal disposed guide roller 32 freely rotatable about a vertical axis. The rollers 32 act to guide the chain 12 along a path defined by a pair of parallel guide rails 34. The pair of parallel guide rails 34 and the pair of parallel support rails 18 are bolted or welded to the top of a support platform or, alternatively and as illustrated, on spacer transverse channel members 36 in turn supported from the ground by support legs 38.

The drive and guide chain 12, as best shown at FIGS. 2-3, comprises alternate socket links 40 and trunnion links 42, which may be of the same overall length or which may be of different lengths as illustrated. The socket links 40 and trunnion links 42 are identical, with the exception that the socket links 40 are provided at each end with a socket member 44 while the trunnion links 42 are provided at each end with a trunnion member 46 connectable with a corresponding socket member 44, the plate 22, in the example of structure illustrated, being attached, such as by welding for example, on the top of each socket member 44.

Each socket link 40 is made of two pivotable bifurcated half-links 48 and 50 pivotably joined proximate their ends by a pivot pin 52 passed through aligned bores 54 and 56 respectively in the half-link 48 and the half-link 50. The pivot pin 52 further holds in position a guide roller 32 which, as best shown at FIG. 5, is mounted on ball bearings 58, the inner race of which is axially mounted around a bearing sleeve 60 fitting in the aligned bores 54 of the half-link 48, while the pivot pin 52 is engaged, at its ends, directly in the aligned bores 56 of the half-link 50. It is to be noted that the half-links 48 and 50 are preferably made of the same elements, the half-link 50 being further provided with a pair of longitudinally projecting parallel extension plates 62 welded, as shown at 63 at FIG. 3, such as to provide an extension for the half-link 50, the end of the half-link 48 pivotally attached to the half-link 50 by the pivot pin 52 being disposed within the bifurcation formed by the extension plates 62. Within the bifurcation of the half-link 50 is mounted a puller member 64 having an engagement surface 66, FIG. 2, for the puller dogs at the conveyor drive unit, not shown, the puller member 64 being attached to the half-link 50 by a pair of pins 68 and 70.

Each half-link 48 and 50 is formed by the spaced-apart lugs or arms 73 and 75 of a socket member 44. Each socket member 44 comprises an upper load-transmitting member 72 formed integral with the lug or arm 73 and a complementary lower locking member, or cap, 74 formed integral with the lug or arm 75, and clamped to each other along a stepped junction horizontal surface 76 by an appropriate screw or bolt 78, FIGS. 2, 4 and 11–12. The load-transmitting member 72 has a substantially semi-circular cylindrical socket 80, preferably relieved at an edge as shown at 81, and the conforming locking member, or cap, 74 has a segment cylindrical surface 82, the substantially semi-circular cylindrical surface 80 and the segment cylindrical surface 82 surrounding over an arc of more than 180° the partially cylindrical surface 84 of an offset trunnion 86 formed at the end of the trunnion member 46 such that the trunnion 86 is securely captured in the partially cylindrical socket surfaces 80–82 of the socket member 44.

Each trunnion link 42 is similarly made of two half-links 88 and 90, each provided at an end with a trunnion member 46. The half-link 90, provided with welded-on extension plates 91, is pivotally connected to the half-link 88 by a pivot pin 52 adapted to also support the guide roller 32. A puller member 64 is installed between the bifurcated portions of the half-link 90 by means of securing pins 68 and 70. For convenience of assembly, each trunnion member 46 is made of two separate half portions 92 and 94 clamped together at complementary stepped surfaces 96 by means of a screw or bolt, such as bolt 98, FIGS. 11–12, the half portions 92 and 94 ending respectively in lugs or arms 93 and 95 such as to form a bifurcated portion within which is mounted the roller 32, and over which are disposed the extension plates 91 of the half-link 90.

It can thus be seen that the conveyor drive and guide chain 12 is capable of pivoting around a vertical axis as defined by the axes of the pivot pins 52, and about a horizontal axis as defined by the axis of the conforming cylindrical surfaces 80–82 of each socket member and the cylindrical peripheral surface 84 of the trunnion end 86 of each trunnion member 46. Preferably, such horizontal and vertical axes are substantially perpendicular to the centerline of the chain 12.

Lateral displacement of the socket member 44 relative to the trunnion member 46 is prevented, as shown at FIGS. 6–12 by providing the concave cylindrical surface 80 of the socket member 72 with a longitudinally disposed V-shaped ridge or bead 100 engaged in a complementary V-shaped groove 102 formed in the convex cylindrical surface 84 of the trunnion 86 of the trunnion member 46. The permit angulation of the trunnion member 46 relative to the socket member 44, as shown at FIGS. 11–12, the V-shaped groove 102 on the cylindrical surface 84 of the trunnion 86 is formed in two sections 104 and 106 disposed at an angle of more than 180° and converging to an apex 108 disposed substantially along the centerline of the assembly between the cylindrical socket member 72 and the cylindrical trunnion member 46.

It will be readily apparent to those skilled in the art that the structure of the conveyor chain 12 of the present invention provides for sturdy pivoting coupling between the chain links 40 and 42, utilizing a small number of different parts and providing assembly of the chain links, and disassembly, by means of a single bolt 78 disposed at each end of the alternate socket links 42, such that assembly and repair of the chain can easily be effected in the field. It will be further appreciated that although the pivoting coupling between the chain links by way of the cylindrical socket and cylindrical trunnion structure of the invention permits the links to pivot about a horizontal axis, the pivoting coupling between the half-links may be effected about a vertical axis of pivoting by similar socket and trunnion couplings, with one guide roller rotatably mounted, for example, on one end of the trunnion 86, or a pair of guide rollers mounted each on one end of the trunnion member 86.

Having thus described the present invention by way of examples of structure thereof, modification whereof will be apparent to those skilled in the art, what is claimed as new is as follows:

1. A conveyor drive and guide chain comprising a plurality of consecutive socket links and trunnion links, each of said socket and trunnion links comprising a pair of half-links interconnected at a pivotal connection about a first pivot axis, said half-links being bifurcated at an end and the bifurcated end of one of said half-links being disposed within the bifurcated end of the other at said pivotal connection, a guide roller mounted at said pivotal connection about said first pivot axis for rolling engagement with one or the other of a pair of parallely disposed guide rails, a cylindrical socket at each end of said socket links and a cylindrical trunnion member at each end of said trunnion links for pivotal connection of each socket link to an adjacent trunnion link about a second pivot axis substantially at a right angle to said first pivot axis, said cylindrical socket comprising a first socket member integrally formed at each end of said socket links and having a partially circular cylindrical recess, a separate second socket member attachable to said first socket member, said second socket member having a segment circular recess portion forming with said partially circular cylindrical recess of said first socket member a cylindrical concave surface extending over an arc of more than about 180°, each said cylindrical trunnion member being integrally formed at each end of said trunnion links and having a peripheral cylindrical convex surface extending over more than about 180° in engagement with said socket cylindrical concave surface, wherein said consecutive socket links and trunnion links are pivotably interconnected about said second pivot axis by engagement of each trunnion member between said first and second socket members and attaching said second socket member to said first socket member.

2. The conveyor chain of claim 1 wherein a puller dog engaging member is mounted on each of said links.

3. The conveyor chain of claim 1 further comprising means connecting at least every alternating link to a conveyor load-transmitting means.

4. The conveyor chain of claim 1 further comprising means preventing relative lateral displacement of said socket and trunnion member.

5. The conveyor chain of claim 4 wherein said means preventing relative lateral displacement of said socket and trunnion member comprises a longitudinally aligned ridge projecting from said cylindrical concave surface of said socket and a groove in the peripheral surface of said trunnion member in which said ridge projects.

6. The conveyor chain of claim 5 wherein said ridge is V-shaped in section and said groove is V-shaped in section.

7. The conveyor chain of claim 1 wherein said first socket member and said second socket member are joined along a stepped surface.

8. The conveyor chain of claim 1 wherein said first and second socket members are formed each with an extension forming said bifurcated end of said half-link.

9. A conveyor chain comprising a plurality of consecutive socket links and trunnion links provided with cylindrical socket and trunnion means for pivotally interconnecting said links, wherein each of said socket and trunnion links comprises a pair of half-links interconnected by a pivotable connection, said cylindrical socket means comprises a first socket member at each end of said socket links integrally formed with one of said half-links of said socket link and a detachable second socket member, said first and second socket members defining a circularly cylindrical recess forming a cylindrical concave surface extending over an arc of more than about 180° and said trunnion means comprises a cylindrical trunnion member at each end of said trunnion links integrally formed with one of said half-links of said trunnion link and having a peripheral cylindrical convex surface extending over more than about 180° in engagement with said cylindrical concave surface, wherein each of said cylindrical trunnion members of said trunnion links is engaged in the circularly cylindrical socket recess of one of said means by attaching said first and second socket members together, said conveyor chain further comprising means preventing lateral displacement of said socket and trunnion means consisting of a longitudinally aligned ridge projecting from said cylindrical surface and a groove in the peripheral surface of said cylindrical trunnion member in which said ridge projects.

10. The chain of claim 9 wherein said ridge is V-shaped in section and said groove is V-shaped in section.

* * * * *